(12) United States Patent
Garfield

(10) Patent No.: US 10,865,823 B2
(45) Date of Patent: Dec. 15, 2020

(54) METAL CHANNEL ANCHOR WITH ENHANCED HOLDING STRENGTH

(71) Applicant: Theodore Garfield, Old Greenwich, CT (US)

(72) Inventor: Theodore Garfield, Old Greenwich, CT (US)

( * ) Notice: Subject to any disclaimer, the term of this patent is extended or adjusted under 35 U.S.C. 154(b) by 0 days.

(21) Appl. No.: 15/886,423

(22) Filed: Feb. 1, 2018

(65) Prior Publication Data

US 2018/0216647 A1 Aug. 2, 2018

Related U.S. Application Data

(60) Provisional application No. 62/453,281, filed on Feb. 1, 2017.

(51) Int. Cl.
| | | |
|---|---|---|
| *F16B 13/04* | (2006.01) | |
| *F16B 13/08* | (2006.01) | |
| *F16M 13/02* | (2006.01) | |
| *B21D 53/36* | (2006.01) | |
| *F16B 35/04* | (2006.01) | |
| *F16B 13/00* | (2006.01) | |
| *F16B 13/10* | (2006.01) | |

(52) U.S. Cl.
CPC ............. *F16B 13/04* (2013.01); *B21D 53/36* (2013.01); *F16B 13/0808* (2013.01); *F16M 13/022* (2013.01); *F16B 13/002* (2013.01); *F16B 13/0833* (2013.01); *F16B 35/041* (2013.01); *F16B 2013/105* (2013.01); *F16M 13/02* (2013.01)

(58) Field of Classification Search
CPC .. E04B 2/72; F16B 13/0808; F16B 2013/105; F16B 13/04; E04G 23/0203; H02G 3/123; F16M 13/02; B21D 53/36
USPC ................................. 411/344, 345, 340, 346
See application file for complete search history.

(56) References Cited

U.S. PATENT DOCUMENTS

| | | | | | |
|---|---|---|---|---|---|
| 979,841 | A | * | 12/1910 | Goewey | ............... F16B 13/0808 411/345 |
| 1,035,399 | A | * | 8/1912 | Wheeler, Jr. | ........ F16B 13/0808 411/346 |
| 1,084,289 | A | * | 1/1914 | Newhall | ............. F16B 13/0808 411/346 |
| 1,167,577 | A | * | 1/1916 | McCain | .............. F16B 13/0808 411/345 |

(Continued)

*Primary Examiner* — Hiwot E Tefera
*Assistant Examiner* — Taylor L Morris
(74) *Attorney, Agent, or Firm* — Israel Nissenbaum; Yitey Nissenbaum

(57) ABSTRACT

A longitudinal channel with increased holding strength, configured for use as an anchoring element for an anchor used in supporting objects on a substrate and a method for the production thereof and an anchor. The channel has a generally U-shaped axial cross section in at least a portion thereof with, the U-shaped cross section being comprised of longitudinal side walls and a longitudinal base connection between the side walls. The side walls have free edges configured for holding contact with the substrate. A portion of the free edges of the channel are covered with a planar continuous surface material which is co-extensive with non-covered free edges whereby the planar continuous surface material and the free edges provide a planar holding surface with greater surface area than that of the free edges alone for the increased holding strength.

4 Claims, 3 Drawing Sheets

(56) References Cited

U.S. PATENT DOCUMENTS

| | | | | |
|---|---|---|---|---|
| 1,179,449 A * | 4/1916 | Newhall | F16B 13/0808 | 411/346 |
| 1,556,345 A * | 10/1925 | Pleister | F16B 13/0808 | 411/346 |
| 1,733,693 A * | 10/1929 | Porter | F16B 13/0808 | 411/345 |
| 1,956,623 A * | 5/1934 | Pleister | F16B 13/0808 | 411/346 |
| 2,144,895 A * | 1/1939 | Place | F16B 13/0808 | 411/342 |
| 2,301,135 A * | 11/1942 | Molat | F16B 13/0808 | 411/345 |
| 2,532,040 A * | 11/1950 | Seely | F16B 13/0808 | 411/345 |
| 2,565,391 A * | 8/1951 | Molat | F16B 13/0808 | 411/342 |
| 2,567,372 A * | 9/1951 | Gelpcke | F16B 13/0808 | 411/342 |
| 2,933,969 A * | 4/1960 | Huyssen | F16B 13/0808 | 411/345 |
| 3,083,795 A * | 4/1963 | Land | E04B 2/821 | 248/354.3 |
| 3,170,361 A * | 2/1965 | Vaughn | F16B 13/0808 | 411/341 |
| 3,389,631 A * | 6/1968 | Vaillancourt | F16B 13/0808 | 411/346 |
| 3,583,122 A * | 6/1971 | Biegajski | E04G 23/0203 | 428/63 |
| 4,009,634 A * | 3/1977 | Barmore | F16B 37/043 | 411/340 |
| 4,043,245 A * | 8/1977 | Kaplan | F16B 37/04 | 411/346 |
| 4,120,231 A * | 10/1978 | Neumayer | F16B 13/0808 | 411/340 |
| 4,286,497 A * | 9/1981 | Shamah | F16B 37/04 | 411/342 |
| 4,294,156 A * | 10/1981 | McSherry | F16B 13/0808 | 411/345 |
| 4,298,298 A * | 11/1981 | Pontone | F16B 13/002 | 411/342 |
| 4,406,569 A * | 9/1983 | Askew | F16B 13/0808 | 411/346 |
| 4,439,079 A * | 3/1984 | Losada | F16B 13/0808 | 24/16 PB |
| 4,449,873 A * | 5/1984 | Barth | F16B 13/0808 | 411/341 |
| 4,650,386 A * | 3/1987 | McSherry | F16B 13/0808 | 411/340 |
| 4,732,520 A * | 3/1988 | Giannuzzi | F16B 13/0808 | 411/342 |
| 5,007,223 A * | 4/1991 | Holland | A47K 10/10 | 411/344 |
| 5,044,854 A * | 9/1991 | Oh | F16B 13/0808 | 411/344 |
| 5,054,981 A * | 10/1991 | Schnedl | F16B 13/0808 | 411/340 |
| 5,110,243 A * | 5/1992 | Oh | F16B 13/0808 | 411/344 |
| 5,197,567 A * | 3/1993 | Rabalais | F16B 13/0808 | 184/1.5 |
| 5,221,814 A * | 6/1993 | Colbaugh | H02G 3/14 | 174/58 |
| 5,236,293 A * | 8/1993 | McSherry | F16B 13/0808 | 29/525.02 |
| 5,716,179 A * | 2/1998 | Smith | F16B 13/0808 | 411/340 |
| 6,161,999 A * | 12/2000 | Kaye | F16B 13/0808 | 411/344 |
| 6,213,701 B1 * | 4/2001 | Ukai | F16B 13/0833 | 411/340 |
| 6,287,065 B1 * | 9/2001 | Berlin | F16B 37/00 | 411/340 |
| 6,318,941 B1 * | 11/2001 | Guenther | F16B 13/0808 | 411/342 |
| 6,484,979 B1 * | 11/2002 | Medlin, Jr. | H02G 3/125 | 248/205.1 |
| 6,779,316 B2 * | 8/2004 | Carroll | E04G 21/3261 | 411/340 |
| 6,821,069 B2 * | 11/2004 | Ikuta | F16B 13/0808 | 411/340 |
| 6,884,012 B2 * | 4/2005 | Panasik | F16B 13/0833 | 411/29 |
| 6,913,430 B2 * | 7/2005 | Ito | F16B 13/0808 | 411/340 |
| 6,979,779 B2 * | 12/2005 | Grady | H02G 3/126 | 174/50 |
| 7,132,601 B1 * | 11/2006 | Seff | H02G 3/088 | 174/50 |
| 7,226,261 B1 * | 6/2007 | Bristol | F16B 13/0808 | 411/340 |
| 7,547,171 B2 * | 6/2009 | McDuff | A47G 1/20 | 411/400 |
| 7,611,316 B2 * | 11/2009 | Panasik | F16B 13/0808 | 411/340 |
| 7,762,507 B2 * | 7/2010 | Del Pino | F16B 13/0808 | 248/231.91 |
| 7,882,676 B2 * | 2/2011 | Ellis | E04B 2/7457 | 52/489.1 |
| 7,955,392 B2 * | 6/2011 | Dewey | A61B 17/7068 | 606/248 |
| 8,234,820 B2 * | 8/2012 | Forbis | F24B 1/198 | 52/36.3 |
| 8,445,779 B1 * | 5/2013 | Gretz | H02G 3/123 | 174/480 |
| 8,449,236 B2 * | 5/2013 | McDuff | F16B 13/0808 | 411/344 |
| 8,499,497 B1 * | 8/2013 | Hugueley | F24F 13/082 | 49/463 |
| 8,529,176 B2 * | 9/2013 | Jutila | B60P 7/0807 | 410/106 |
| 8,777,035 B2 * | 7/2014 | Gagne | H02G 3/121 | 220/3.3 |
| 8,814,485 B2 * | 8/2014 | Gleason | F16B 13/0808 | 411/344 |
| 8,858,143 B2 * | 10/2014 | Gaudron | F16B 13/0808 | 411/344 |
| 8,950,992 B1 * | 2/2015 | Vayntraub | F16B 13/04 | 411/344 |
| 8,985,364 B2 * | 3/2015 | Gagne | H02G 3/36 | 220/3.3 |
| 9,039,338 B2 * | 5/2015 | Kaye | F16B 13/0808 | 411/349 |
| 9,303,669 B2 * | 4/2016 | Agri | F16B 13/0808 | |
| 9,777,493 B2 * | 10/2017 | Roberts | F16B 13/0808 | |
| 2002/0154965 A1 * | 10/2002 | Ikuta | F16B 13/0808 | 411/340 |
| 2006/0101765 A1 * | 5/2006 | Bailey | E04G 23/0207 | 52/514 |
| 2006/0261223 A1 * | 11/2006 | Orndorff, II | E04B 2/7409 | 248/220.1 |
| 2008/0080948 A1 * | 4/2008 | Barclay De Tolly | F16B 5/123 | 411/340 |
| 2012/0045292 A1 * | 2/2012 | Kaye | F16B 13/0808 | 411/80.1 |
| 2016/0131304 A1 * | 5/2016 | Roberts | E04B 9/006 | 52/741.1 |
| 2016/0157680 A1 * | 6/2016 | Gucciardo | A47K 3/003 | 52/27 |
| 2016/0168862 A1 * | 6/2016 | Mann | E04C 2/38 | 248/251 |
| 2016/0334054 A1 * | 11/2016 | Grande Fern Ndez | F16M 13/02 | |
| 2017/0307000 A1 * | 10/2017 | Daly | F16B 13/0808 | |
| 2018/0335064 A1 * | 11/2018 | Wilson | F16M 13/02 | |

* cited by examiner

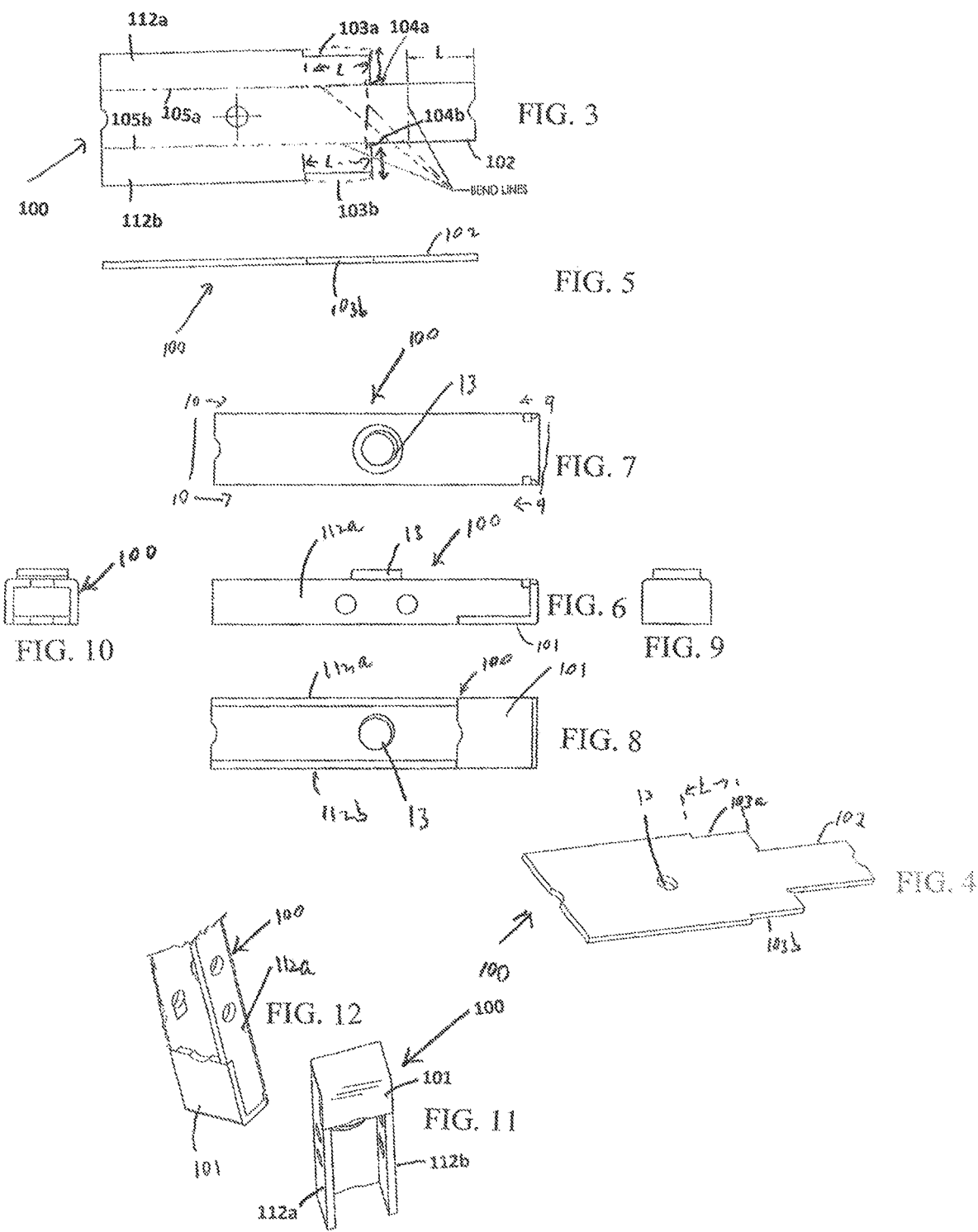

METAL CHANNEL ANCHOR WITH ENHANCED HOLDING STRENGTH

FIELD OF THE INVENTION

This invention relates to increasing holding strength of channel type anchors used in supporting items on substrates and particularly relates to channel anchors having generally U shaped cross sectional metal channels inserted into substrates with typically frangible plastic manipulating straps.

BACKGROUND

Numerous metal channel anchors such as the Snap-Toggle® anchor from Mechanical Plastics Corp. utilize a longitudinal channel shaped metal element usually of U-shaped cross section connected to one or two plastic longitudinally extending manipulating straps rotatably affixed to an interior of the metal channel. The anchor forms a roughly T-shaped configuration with the interior of the channel facing the straps. The channel, such as with the U-shaped cross section configuration has two, usually parallel, side elements connected with a flat base with the side elements having blunt free edges.

In operation, for deployment in a substrate, the metal channel is rotated or swiveled into alignment with the longitudinally extending straps, which are fitted within the U-shaped channel to provide a minimally sized axial cross section for insertion within a correspondingly minimally sized insertion hole in the substrate. A minimally sized (relative to the rest of the channel) longitudinal end of the metal channel, closely sized in relation to the insertion hole, is inserted through the aperture and once the entire channel clears the aperture, the metal channel is manipulated with the connected strap or straps, or with a spring action or even a gravity drop or the like, to return the metal channel to its T-shaped positional configuration. Thereafter, the channel is pulled by the strap or straps into full and flat maximum surface holding engagement of the blunt free edges with the interior surface of the substrate, adjacent the aperture. Typically, a ratcheting movable apertured cap or hat is slidable on the strap or straps to fix the anchor in position and residual strap length is snapped off. The flat base of the channel is typically apertured and the aperture is threadingly tapped with threads for engagement with an inserted bolt or other fastening element used to support items on the substrate. With such configuration, the free edges of the side walls of the channel engage the non-accessible surface of the substrate. However, in relatively soft materials such as wall boards or sheetrock with a gypsum and paper composition, the free, or upper edges of the channel act as blunt knives against a sheetrock substrate as a failure mode, even though the structure and strength of the metal channel is not affected.

SUMMARY OF THE INVENTION

It is accordingly an object of the present invention to provide a metal channel structure with enhanced holding strength, particularly in sheetrock substrates with retarding of the onset of failure mode in the sheetrock.

It is a further object of the present invention to provide an economical and feasible manufacturable structure for the metal channel.

It is a still further object of the present invention to provide a manufacturing method of metal channels having enhanced holding strength.

Generally the present invention comprises a longitudinal channel, most commonly of metal, as an anchoring element for an anchor used in supporting objects on a substrate. The channel has a generally U-shaped axial cross section in at least a portion thereof comprised of longitudinal side walls and a longitudinal base connection between the side walls with the side walls having free edges configured for holding contact with the substrate. The present invention further comprises a method for the economical production thereof. The channel is configured for use in an anchor comprised of the channel and manipulating elements for position manipulating of the channel on an inaccessible side of the substrate and a structural member for maintaining the channel in position on the substrate, for use of the anchor in affixing an object to the substrate. In accordance with the invention a portion of the free edges of the channel are covered with a continuous surface material which is co-extensive with non-covered free edges whereby a generally continuous flat surface material and the free edges provide a planar holding surface with greater surface area than that of the free edges alone. The continuous surface material in various embodiments, may be a covering section positioned on a recessed portion of the free edges to provide the continuous planar holding surface or the volume between a portion of the side walls may be partially or entirely filled up to the level of the free edges to provide the continuous planar holding surface at a level of the free edges.

In one embodiment, the anchor in which the channel of the present invention is utilized comprises at least one or two manipulating straps swivally or rotatably internally engaged with the channel at about the midpoint of the length thereof. The metal channel has a threaded aperture for insertion of a supporting bolt proximate a single strap or between two straps. The channel is sized and configured to accommodate the folding of the manipulating strap element(s) therein to present a minimally sized anchor for insertion in an aperture of a substrate.

In accordance with an embodiment of the invention, the channel comprises a planar surface section thereof on one side of the threaded aperture therein which planar section is configured to supportingly engage a substrate rather than the free edges of side walls of the channel. The other side of the channel relative to the threaded aperture remains open with exposed free edges of the side walls. The planar substrate engaging section is adapted to be positioned in a vertical upper position of the anchor when the channel is vertically positioned behind a substrate. Gravity factors related to the supported object results in the upper portion of the channel bearing with more force against the substrate. This channel positioning results in the planar section more fully engaging the substrate instead of the splayable blunt" knife edges" of the side walls thereby significantly increasing the holding resistance of the anchor by decreasing substrate failure. Since only increased surface area is a factor of the decrease, the planar section may be solid or hollow without change in surface area of the bearing planar surface.

In an embodiment which is readily manufacturable the channel is formed from a generally rectangular metal strip portion with an integral end portion extension on one side. The rectangular metal strip portion is configured to form the U-shaped channel, as in prior art channels. The integral end portion extension is configured and dimensioned to be folded up with a first fold to cover an open lateral end of the channel and to be further folded over the open top of the channel. The width of the metal section of the first and second folds is substantially the distance between the outer surfaces of the legs of the U-shaped channel. The fold-over length of the second fold is not more than the distance from the proximal end of the channel to alignment with the edge of central tapped aperture or the position of a strap in the T shape form whereby the second fold does not interfere with either the strap or an inserted bolt. The upper end of the channel is notched to a depth equal to the thickness of the metal fold to accommodate the second metal fold whereby the upper end of the channel legs and the upper surface of the second fold are in a single plane.

With such configuration, a significant portion of the channel leg ends in contact with a sheetrock surface is increased by about 25 to 30 times the surface area (with a typical prior art metal channel) with increased holding and reduction of failure mode. During installation of an anchor with the fold over metal areas, the folded over section of the metal anchor should be located in an upper position of the anchor expansion whereby gravitational forces in shear are all resisted by the folded over metal section.

A method for making a longitudinal channel embodiment comprises the steps of:
 i. stamping out a one piece metal blank of generally rectangular configuration having a longitudinal axis, two width ends and two length ends. The blank is formed with a centrally positioned aperture and a generally rectangular tongue section having edges along the longitudinal axis and extending centrally out of one width end of the blank in a direction along the longitudinal axis and equally spaced from the length ends. The length of the blank is provided with having two recesses formed in edges thereof with each recess having a width equal to a thickness of the metal blank and a length equal to each other. The length of the recesses is no greater than a distance from a width end to the aperture in order not to impede any inserted fastening element. The length of the tongue is equal to the spacing thereof to the longitudinal end plus the length of the recesses in order to closely fit the tongue section to the remaining portion of the channel;
 ii. folding each side of the metal blank along a line longitudinal coextensive with the edges of the tongue section to a perpendicular position to form channel legs;
 iii. folding the tongue section into a perpendicular position closely adjacent the perpendicular legs; and
 iv. folding the perpendicularly extending tongue section at ends of the channel legs to perpendicularly fit into the two recesses;
 whereby a surface of the tongue section is coextensive and planar with remaining edges of the legs.

The above and other objects, features and advantages of the present invention will become more evident from the following discussion and drawings in which:

SHORT DESCRIPTION OF THE DRAWINGS

FIG. 1 is a prior art metal channel anchor with manipulating straps;

FIGS. 2A-D is a sequential depiction of the installation of the anchor of FIG. 1, from insertion within an aperture in a wall (FIG. 2A), expansion behind the wall and position locking with the ratcheting cap (FIG. 2B), snapping off of excess strap material (FIG. 2C) and bolt and object installation (FIG. 2D);

FIG. 3 is a top view of a metal blank configured for folding of sections to form a metal channel of the present invention;

FIG. 4 is a perspective view of the metal blank of FIG. 3;

FIG. 5 is a side view of the metal blank of FIGS. 3 and 5 showing a uniform metal thickness;

FIG. 6 is a side view of a metal channel formed from the blank of FIGS. 3-5;

FIG. 7 is a top view thereof;

FIG. 8 is a bottom view thereof;

FIG. 9 is an end view taken along line 9-9 of FIG. 7;

FIG. 10 is an end view taken along line 10-10 of FIG. 7;

FIG. 11 is a perspective view of the metal channel of FIG. 6 with the fold section on top; and FIG. 12 is a perspective view of the metal channel of FIG. 6 with the fold section on bottom.

DETAILED DESCRIPTION OF INVENTION AND DRAWINGS

Figure 1:
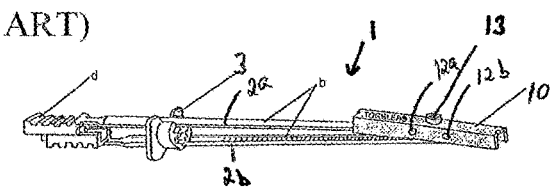

FIG. 1 depicts a typical commercially available anchor 1 having a metal channel anchoring element 10. The channel element 10 is configured to be tightly drawn against a substrate and locked into position to effect an anchoring configuration for objects to be anchored to the substrate. An installation sequence and final anchoring position is shown in FIGS. 2A-2D which depicts the manner in which the anchor 1 of FIG. 1 is installed on a typical wall substrate such as of gypsum wallboard or sheetrock.

Figure 2A:
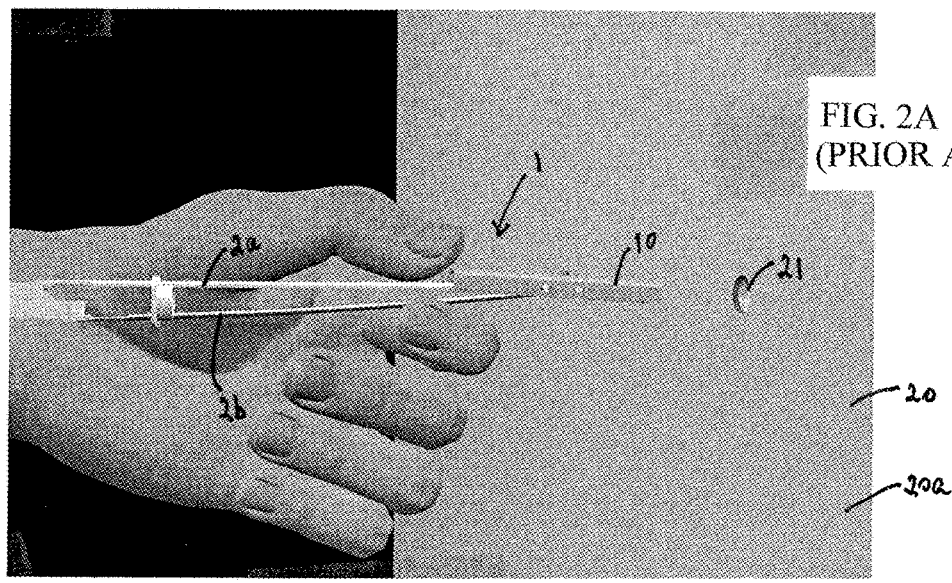
Figure 2B:
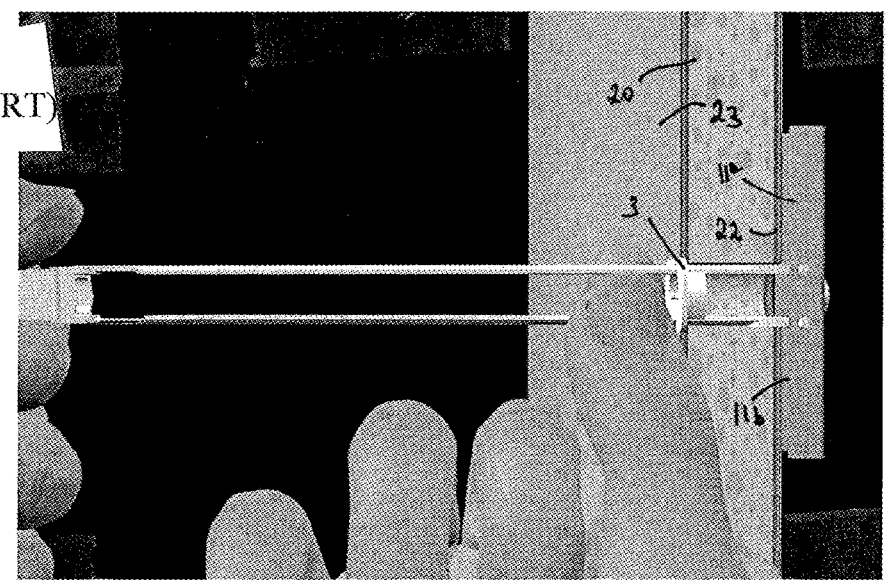
Figure 2C:
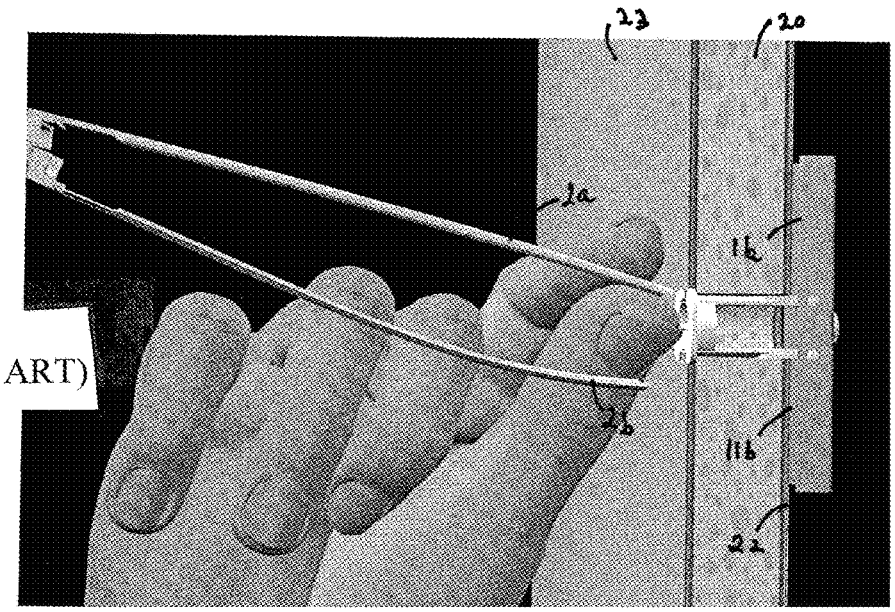
Figure 2D:
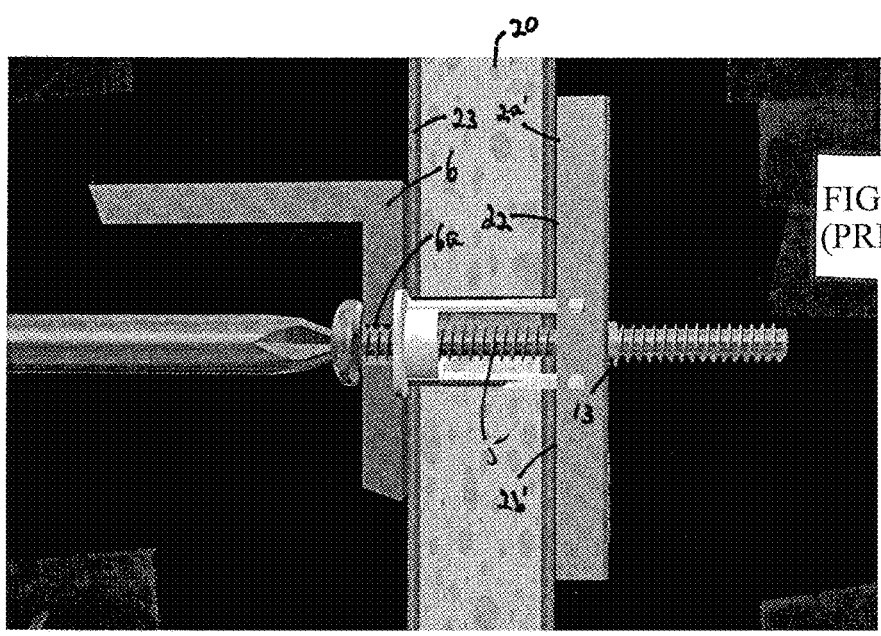

In FIG. 2A, the anchor 1, in the folded configuration shown in FIG. 1, is inserted into aperture 21 in wall board 20, with leading channel element 10 until proximal end 10a clears the interior surface 20a of the wall board 20 peripheral to aperture 21. At this point, anchor legs 2a and 2b are slidingly aligned to cause the channel 10, pivotally attached to legs 2a and 2b at apertures 12a and 12b, to assume the position shown in FIG. 2B with the channel upright sections 11a and 11b bearing directly against the interior surface 22 of the wall board 20. One way ratcheting aperture cap or hat 3 is moved into snug contact with the exterior wall surface 23 of the wall board 20 proximate to aperture 21. Remaining outwardly extending sections of anchor legs 2a and 2b are snapped off, as shown in FIG. 2c to complete the positioning placement of anchor 1 in wall 20. FIG. 2D further depicts the use of bolt 5 to fasten the bracket 6 to the anchor 1 on wall board 20. Bolt 5 passes through an aperture 6a in the bracket 6, the aperture in cap 3 and is threaded into threaded aperture 13 to complete the anchoring operation.

As is evident from FIG. 2D, upper leg sections 2a' and 2b', which bear against interior wall board surface 22, strain the surface with a concentrated small area force at the free edges of the upper leg sections 2a' and 2b' and the gravitational forces exerted by weight on the bracket 6. The edges pf upper leg sections 2a' and 2b' are akin to blunt knife edges against a yielding gypsum wallboard, with anchor failure and upper load limit being attributable thereto.

The modified channel element 100 is shown in FIGS. 3-12 as being formed from a shaped metal blank shown in FIGS. 3-5 to the formed channel 100 of FIGS. 6-12 with flat bearing surface 101 instead of the prior art blunt load bearing edges 2a' and 2b' of the prior art.

Starting with the channel blank 100 in FIGS. 3-5, an essentially rectangular blank (shown in dashed lines in FIG. 3) which forms the prior art channel 10, is modified with the addition of integral fold-over tongue section 102. Indents 103a and 103b are formed with a length corresponding to length L of tongue section 102 and a width equivalent to the thickness of the metal blank material. Indent sections 104a and 104b serve to relieve stress of folding of the blank metal. Fold lines 105a and 105b, in FIG. 3 are essentially the same as those of the prior art channel used to position and form legs 112a and 112b thereof. Fold lines 106a and 106b show where tongue section 102 is folded up and then over the top of formed legs 112a and 112b for seating into indents 103a and 103b. Flat bearing surface 101 is integrally formed without extending areas which may snag on the insertion aperture 21 as shown in FIGS. 6, 8, 11 and 12. The tongue section 102 extends from one end of the channel blank to permit an opposite open end for folding placement of anchor legs 2a and 2b into the channel 100 during insertion of the anchor into the insertion aperture 21. Maximum length of the flat bearing surface 101 is up to the position of threaded aperture 13 so as not to impede bolt insertion. Aside from the overlapping tongue section 102, the channel is the same as that of the prior art channel as in views of FIGS. 6-12, with corresponding pivoting leg engaging apertures 12a and 12b and bolt engaging threaded aperture 13.

In order to maximize the holding strength and reduce untoward failure in sheet rock material, the anchor is installed such that the load bearing surface is positioned above the insertion aperture whereby the flat bearing surface directly resists gravitation pull out forces.

It is understood that the above drawings and example is illustrative of the present invention and that changes may be made to the structure and configuration of the channel and the method of production thereof such as by casting to make the channel solid at the flat surface bearing section of the channel. Other changes in structure, materials, configuration, method of production and the like may be made without departing from the scope of the invention as defined in the following claims.

What is claimed is:

1. A longitudinal channel providing increased holding strength, configured for use as an anchoring element for an anchor used in supporting objects on a substrate, the channel comprising a generally U-shaped axial cross section in at least a portion thereof, the U-shaped cross section being comprised of longitudinal side walls and a longitudinal base section as a connection between the side walls with the side walls having edges configured for holding contact with the substrate;

wherein a portion of the edges of the channel are covered with a planar continuous surface material which is co-extensive with non-covered edges, wherein the channel is comprised of metal and whereby the planar continuous surface material and the edges provide a planar holding surface with greater surface area than that of the edges alone, for the increased holding strength, wherein the longitudinal base section is apertured in the center thereof with a threaded aperture configured for threaded engagement with a threaded holding element and wherein the planar holding surface is only positioned on one side of the aperture in a longitudinal direction of the channel, whereby at least one longitudinal manipulating element, rotatably attached to the channel, is capable of being fitted into the channel on a second side of the aperture during placement of the channel through an aperture in the substrate, wherein the planar continuous surface material comprises a covering section positioned on a recessed portion of the edges to provide the planar holding surface and wherein the channel comprises an integral one piece element, wherein a portion thereof is folded over and fitted into the recessed portion and comprises the planar holding surface.

2. The longitudinal channel of claim 1 wherein the planar holding surface comprises a surface of partially or completely filled in volume between a portion of the side walls filled up to the level of the edges to provide the planar holding surface to a level of the edges.

3. The longitudinal channel of claim 1, wherein an end portion of the longitudinal base connection extending beyond facing ends of the longitudinal side walls is folded with a first fold to cover an end of the longitudinal channel and further folded with a second fold to cover a portion of the longitudinal channel, the second fold being fitted upon facingly recessed portions of terminal portions of facing ends of the longitudinal side walls with each recessed portion having a depth equal to a thickness of the end portion, thereby providing the planar holding surface.

4. An anchor configured for supporting objects on a substrate comprising the longitudinal channel of claim 1, the at least one longitudinal manipulating element rotatably connected to the longitudinal channel for positioning the longitudinal channel into a load bearing holding position on a non accessible surface of the substrate, and a position fixing member for fixing the longitudinal channel into the load bearing holding position.

* * * * *